March 27, 1956  B. VARNEY ET AL  2,739,895
METHOD OF MAKING GRANULAR, DEHYDRATED PRODUCTS
Filed April 6, 1953  3 Sheets-Sheet 3

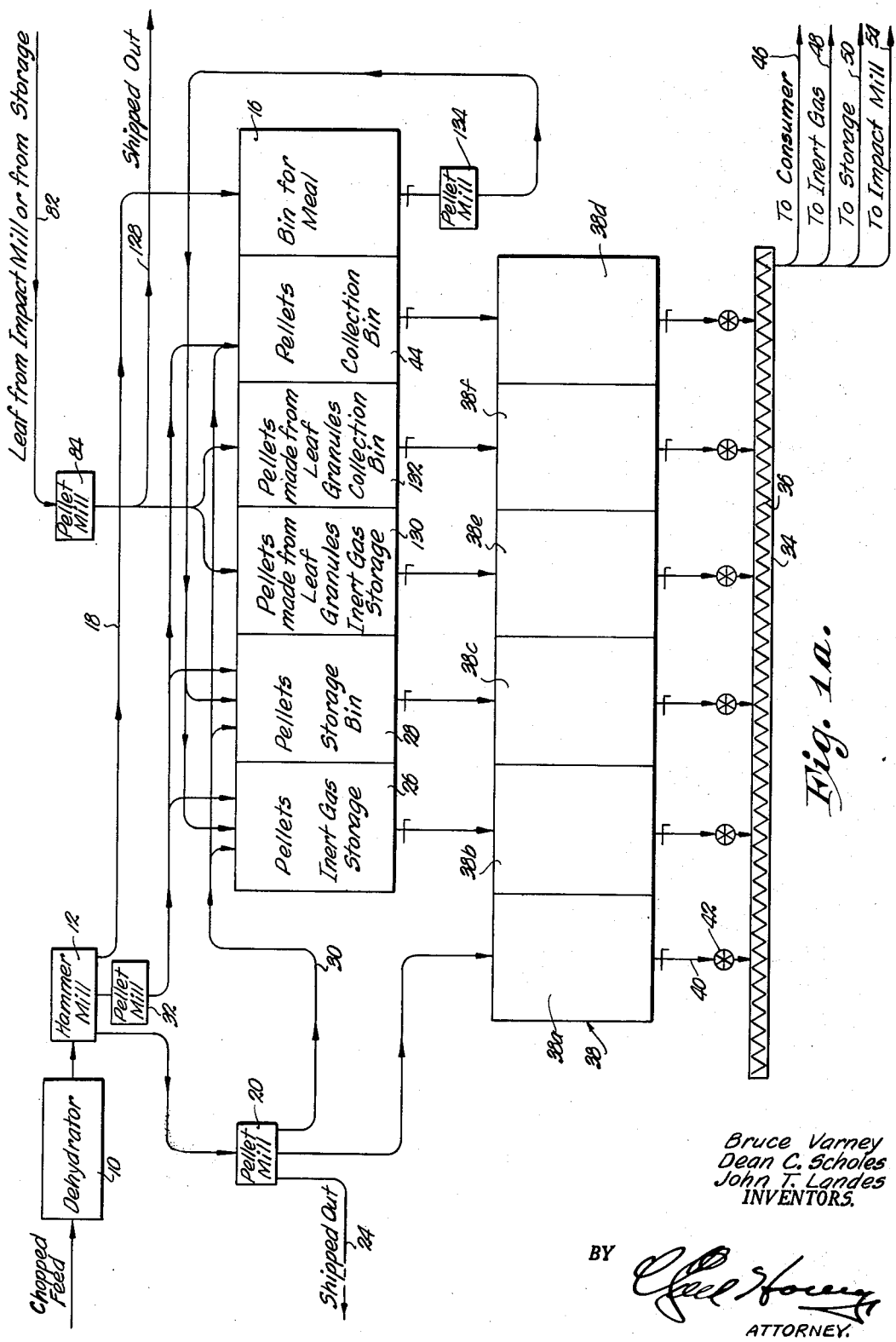

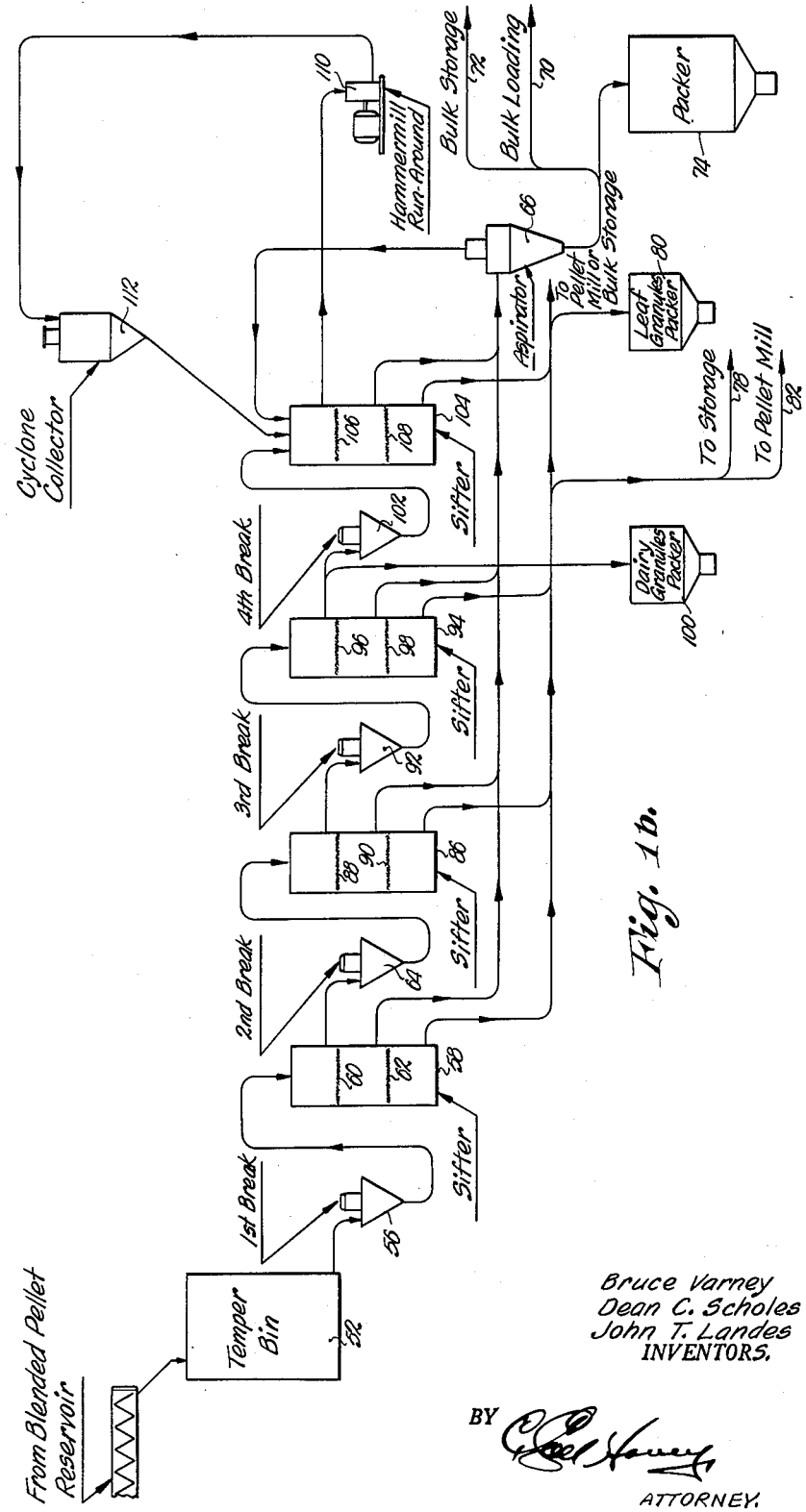

Bruce Varney
Dean C. Scholes
John T. Landes
INVENTOR.

BY

ATTORNEY.

United States Patent Office 2,739,895
Patented Mar. 27, 1956

2,739,895

METHOD OF MAKING GRANULAR, DEHYDRATED PRODUCTS

Bruce Varney and Dean C. Scholes, Kansas City, Mo., and John T. Landes, Salina, Kans., assignors, by mesne assignments, to National Alfalfa Dehydrating and Milling Company, Lamar, Colo., a corporation of Delaware Application April 6, 1953, Serial No. 346,912

4 Claims. (Cl. 99—2)

This invention relates to the handling of organic materials, particularly vegetable matter, for the purpose of placing the same in condition for commercial use, and has for its primary object the provision of a novel system of producing a product of high nutritious value that is easily handled and, therefore, of exceptional value in industry generally.

It is the most important object of the present invention to provide a novel method of producing an economical supplement containing high levels of essential vitamins, proteins, minerals and other important nutritive elements from such crops as alfalfa, grasses, clovers and other adaptable plants, and usable particularly in the mixed feed industry, but having universal adaptation by the very nature thereof in many other allied and unrelated fields.

It is well known that until of relatively recent date, alfalfa and other forage plants have been grown throughout the world principally for hay, pasture and soil improvement. Much has been done however, to adapt such prolific forage plants to other uses since the advent of dehydration, together with the now well-known procedure of grinding the chopped, dehydrated vegetable matter into the form of a dry, pulverized, dusty meal. This meal is today being used quite extensively, particularly in the mixed feed industry, but in attempting to meet the problem of handling such dusty material by pelleting procedures, other problems have been presented.

Notwithstanding such valuable progress that has been made in recent years to adapt alfalfa to new uses, there are many inherent disadvantages, both in the meal and in the pellets that have operated as obstacles to extended uses in industry. Thus, even today, sun-cured alfalfa hay constitutes by far the greatest outlet for this agricultural product.

One of the first developments was in the form of sun-cured alfalfa meal, but this product has been on a rather rapid, continuous decline for the last six or seven years, whereas dehydrated alfalfa meal with its superior nutritive content, has become increasingly more important whether or not the same is pelleted prior to shipment or ultimate use.

The primary objection to dry alfalfa meal, regardless of how the same has been dried, lies in its dustiness and poor flowing characteristics. In the mixed feed industry, the primary user of alfalfa meal, the inherent dusty condition of this product meets with extreme disapproval and, by virtue of the fact further that alfalfa meal does not flow freely and therefore, tends to bridge, it cannot be handled conveniently in bulk form and, for the most part, has been shipped in a packaged condition which is an expensive and time-consuming procedure.

Since the development of practical pelleting procedures, there have been created some new but unimportant demands for the product, but the primary obstacle still remaining is that of breaking the pellets down into usable form. In this respect, in the mixed feed industry, particularly, there is reluctance to utilize the pellets because of the necessity of providing means to reduce the pellets to a usable form because of the expense incident thereto, the difficulty of carrying out the break-down operations, and the dust factor resulting therefrom.

It is therefore, an extremely important object of the present invention to develop new outlets for alfalfa and the like, particularly alfalfa meal and pellets, all through the provision of end products that may be easily handled, inexpensively shipped, and capable of being placed in use not only in the mixed feed industry, but in other fields without experiencing the grave difficulties hereinabove set forth.

Another very valuable aim of this invention is to provide products, derivative of alfalfa and other crops, which are outstandingly new and characterized by their free-flowing properties, all to the end that the same may be easily and quickly handled at all points of shipment, storage, preservation and use in bulk form as may be desired, without the necessity of further processing or packaging.

It is another equally important aim hereof to provide a product of this character which is substantially, if not entirely, dust-free so that when the same is handled in bulk, or in package form if desired, the users will not experience excessive dust losses, be confronted with health or sanitation problems, or be faced with other adverse effects such as in the poultry industry wherein the detrimental effects of the dust of regular alfalfa meals upon the respiratory tract of the fowl and the loss in palatability because of the dust factor have been extremely aggravating problems.

It is contemplated by the present invention that use of the products herein developed will render alfalfa meal, as such, increasingly less important, since all of the advantages emanating from the use of this existing product can be duplicated in the novel products herein developed and all of the disadvantages above set forth and emanating from the use of such meal are fully eliminated. To this end, in accordance with the method hereinafter set forth, all of the meal is first pelleted and thereupon such pellets are reduced to a granular form having novel characteristics not to be found in the meal, not only with respect to dust-free and free-flowing characteristics, but in nutritional value.

It has been found through extensive experimentation that if the alfalfa pellets are broken, shattered or fragmented, the result product can be graded according to size, thereby presenting a granular material differing very little from the pellet itself, in that the same remains in a partially fused condition with substantially all of the leaf constituent still bonded together and, to a large extent, clinging to the fiber of the alfalfa product in clustered relationship thereabout.

It follows from the foregoing that an essential aim of this invention is to provide a method of producing granular alfalfa products which includes the steps of fragmenting pellets and thereupon grading the same to produce a number of differing types of fractions, all of which are free-flowing and some of which are virtually dust-free, there being a leaf fraction of extreme value in that the same has a high protein, low fiber content and a high percentage of carotene (pro-vitamin A), other vitamins, pigments and other important nutritive elements.

A further object of this invention is to present a method of handling products of this type that includes novel steps for providing uniformity in the end products made ready for ultimate use and which embodies the principle of blending pellets of differing protein and vitamin A content so that after the blended pellets are reduced to a fragmentary form, the resulting fractions will each have their own predetermined, characteristic nutritive value.

A still further object of this invention is to provide, through use of the novel process hereof, end products not only of extremely high marketable value, but of high importance to those following the teachings hereof through use as part of the blending process just above set forth, in that it makes possible the utilization of high fiber-low protein alfalfa meal in pellets to produce products having value in the market and capable of demanding a profitable price.

Many additional objects of the present invention too numerous to set forth in detail, will become apparent and more easily understood from the following specification wherein reference is made to the accompanying drawings and in which:

Figure 1a is a schematic flow chart illustrating the initial stages of the method of making granular dehydrated products according to the present invention and showing the apparatus employed in the method diagrammatically.

Fig. 1b is a schematic flow chart constituting a continuation of the chart shown in Fig. 1a and illustrating the final stages of the method employed herein, together with a diagrammatic representation of the apparatus used in the method.

Figure 5:
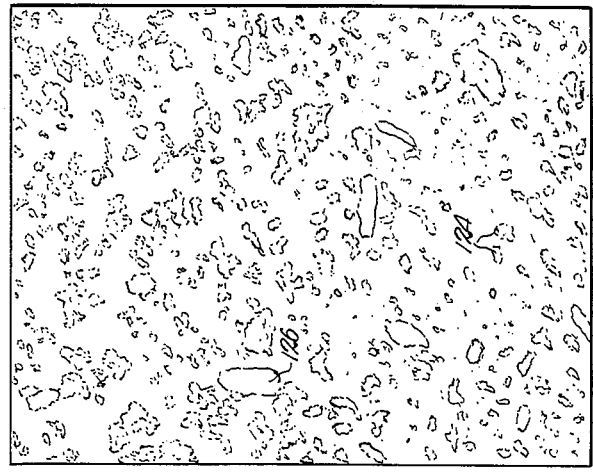
Fig. 5 is an enlarged plan view of a small portion of another of said fractions.

For convenience of description, the present invention will hereinafter be set forth in connection with the method of handling alfalfa and the products emanating therefrom. It is to be understood however, that the method may be employed and products of a similar nature may be produced according to the teachings of this invention through use of many other crops of a similar nature, particularly the legumes or the plants which are generally classified with the pea family as well as grasses and clovers.

Alfalfa and clover are characteristic of that class of crops which is high in vitamins, proteins, fats, carbohydrates, and many valuable minerals. Alfalfa is the primary source of carotene to supply vitamin A activity and, so far as the chemical composition and vitamin content of alfalfa is concerned, the leaflets thereof are extremely valuable, while the stem or fiber is in the nature of a rather tough cellular tissue, its presence in the crop is not altogether invaluable since forage plants of this nature supply needed roughage for feeding of certain domestic animals and fowl.

The value of alfalfa products on the market however, is determined largely by their protein, pro-vitamin A and low fiber content and accordingly, a high fiber product cannot demand high prices on the market.

It is manifest that the fiber-leaf ratio varies considerably throughout the growing season and from year to year, depending upon stage of growth when cut, variety of the crop, soil fertility, weather and other growing conditions as well as manner of processing. At the start of the season and again in the fall when rainfall is plentiful and growing conditions are generally good, the cuttings normally have a high percentage of leaf, whereas summer cuttings are of substantially less value because of high fiber and lower protein vitamin and mineral content. These ratios vary however, from field to field and between different sections of the country and therefore, there has heretofore been no practical, inexpensive way to make alfalfa products of uniform protein and carotene content available throughout the year.

The accepted standard for one grade of dehydrated alfalfa meal in the feed industry, as adopted by the Association of American Feed Control Officials, Inc. is, by definition, that which contains not less than 17% crude protein and not more than 27% crude fiber. A second grade produced to a limited extent is standardized to not less than 20% protein and not more than 22% fiber. Still another grade, defined as "leaf meal," must be composed chiefly of leaves to meet the standard, have not less than 20% protein, and contain not more than 18% fiber.

However, since true leaf meal in a normal growing season is produced in only minute quantities and never with certainty, this superior and highly desirable product is virtually, and for all practical purposes, unattainable in the market day in and day out during the year. Thus, its superior nutritive values have been lost to the poultry feed industry.

Additionally, many manufacturers of dehydrated alfalfa meal now sell their product on the basis of carotene content (or vitamin A activity) guaranteed to be present at the time of delivery. A guaranty of 100,000 I. M. (international units) per pound is the accepted standard for the 17% grade, 125,000 I. M. for the second (20%) grade above-mentioned, and 150,000 I. M. for the leaf meal. It is desirable, however, to make available a product of a true leaf grade having much higher levels of carotene and other nutritive values, and here again, the attainment of this desirable result, on a day to day production throughout the year without being dependent on variable growing and harvesting conditions, is rendered relatively simple through employment of the present invention.

Figure 4:
Fig. 4 is a plan view of a small portion of one of the fractions produced by employment of the method hereof.
Figure 2:
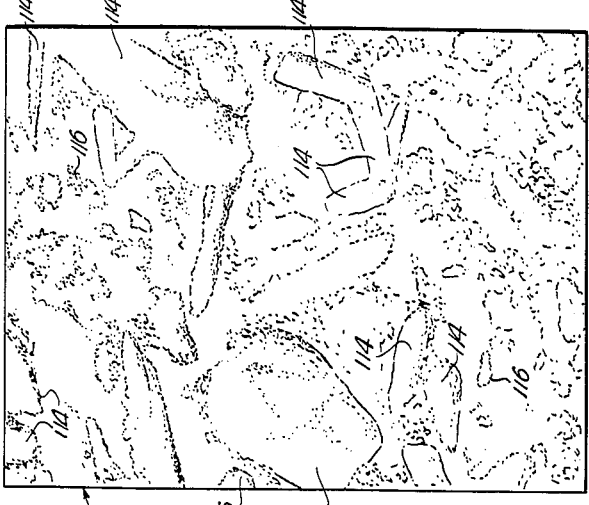
Fig. 2 is an enlarged plan view of a small portion of dehydrated alfalfa meal used in carrying out the method hereof and in producing the products resulting from such method.

The method of producing products such as depicted in Figs. 4 and 5 of the drawings, may be understood by reference to Figs. 1a and 1b of the drawings in the former of which is shown a conventional dehydrator 10 which receives the chopped alfalfa directly from the field in its initial moist condition and normally reduces the moisture content to approximately 7 to 12 percent. The dehydrated alfalfa emanating from the drier 10 is further pulverized by a grinding process such as a hammer mill 12. While the particle size of the alfalfa meal emanating from the mill 12 may vary considerably, it is normally an extremely fine, highly dusty product and many meals, particularly that used for poultry feeding, are passed through a screen as fine as 3/16 inch mesh before being packaged and marketed. This meal is illustrated in Fig. 2 of the drawings and designated by the numeral 14. The characteristics of the meal 14 will be further explained when comparing the same with the products of the present invention.

By virtue of the poor handling characteristics of the meal 14 it is usually packaged at the site of dehydration and since the product emanates from the dehydrator at a rather high temperature, processors must be equipped with cooling means in the nature of rather expensive equipment that is also costly to operate. In the absence of cooling the meal immediately rather than permitting it to cool naturally, the resulting product loses a substantial amount of its carotene content and the danger of fire is an ever present problem.

Much of the meal emanating from the various rural dehydrating plants is shipped to a central point for storage and subsequent re-shipment, requiring a rather large number of bins as at 16 for such storage purposes. Arrowed line 18 in Fig. 1a, illustrates movement of the cooled, dehydrated, packaged meal from the point of packaging to the storage means 16.

Figure 3:
Fig. 3 is an enlarged, perspective view of a dehydrated alfalfa pellet produced from the meal shown in Fig. 2.

Much of the meal so produced is processed at the aforesaid central location by emptying the sacks directly into a pellet mill 20, as shown in Fig. 1a, and the pellets so produced, taking the form shown in Fig. 3 of the drawings and designated by the numeral 22, are either re-shipped as indicated at 24 or directed into storage bins such as at 26 and 28 as shown by line 30.

By virtue of the present invention, including the virtual elimination of alfalfa meal 14 as a marketable product and our desire to eliminate handling of such dusty product as well as packaging thereof, it is proposed that each processor eliminate entirely the cooling step now being employed and the expense incident thereto. In lieu thereof, a pellet mill 32 will be provided to receive the hot meal 14 directly from the hammer mill 12, thereby placing all of the product in the form of pellets 22 prior to shipment to a processing plant carrying out the method of this invention. It is pointed out that re-heating is a necessary step in the pelleting procedure and that each time the temperature of the product is raised and held at the high temperature for any period of time, additional carotene loss results. Furthermore, the product can be processed, shipped and stored in bins such as at 26 for preservation of the carotene content in a minimum amount of time by eliminating the cooling, packaging and emptying steps for pelleting by mill 20. This time-saving factor is extremely important to any process of preserving the carotene (pro-vitamin A) content in storage bins 26.

Such manner of preservation forms no part of the present invention, but is fully set forth in our co-pending application, Ser. No. 346,913, filed on even date herewith and entitled "Method of Inhibiting Oxidation in Stored Forage Crops."

The present invention contemplates another valuable improvement in the manner of handling alfalfa products through a blending procedure that incorporates a blending reservoir 34 such as shown diagrammatically in Fig. 1a. Reservoir 34 containing suitable conveyor means 36, is adapted to receive and mix pellets having varying amounts of protein and vitamins, and to this end there is provided a plurality of receivers 38, each communicating with the reservoir 34 through conduit means 40 provided with a suitable valve 42 for controlling the rate of flow of the pellets to the reservoir 34. For example, pellets emanating from mill 20 may be directed to one or more receivers 38a; pellets stored in containers such as at 26 designed to preserve the vitamin content thereof, may be directed to a receiver 38b; pellets under storage with no means for preservation may be directed from containers 28 to receiver 38c; and pellets emanating from mill 20 or mill 32 may be collected temporarily in bin 44 and fed into a receiver 38d that communicates with the reservoir 34.

It is to be noted at this point that according to the method herein employed, all stored products are tested for protein and vitamin A activity at the time of storage in bins such as at 26, 28 and 44 so that the characteristics thereof are known prior to directing or dumping the same into a respective receiver 38. To this end, as the pellets are unloaded into the storage bins, each car is so checked and records are kept as to the characteristics of the pellets in each of the storage bins. Thus, the pellets in the various receivers 38 will vary in protein and in vitamin A activity and the manner of feeding the same to the blending reservoir 34 will determine the nature of the product as it emanates from reservoir 34.

By way of example, pellets having a high fiber-low protein content, may be mixed with other pellets having high protein-low fiber content to produce an ultimate mixture which may be either shipped directly to the consumer as indicated by line 46, directed to bins such as at 26 for storage and preservation of the vitamin A content as indicated by line 48, directed to any suitable means of storage such as in bins 28 and as illustrated by line 50 or directed to a tempering bin 52 (Fig. 1b) as illustrated by line 54. Tempering bins as such are well known, but in the present invention, the same are utilized to enhance the value of the products produced by the method hereof and to assure proper fragmentation of the pellets 22, as well as facilitate the grading operations hereinafter set forth. It is suffice to point out that the pellets are directed into the bin 52 for hydration purposes and remain therein for a sufficient period of time to permit the pellets to absorb some moisture, render the same less brittle, and thereby condition the pellets for treatment in the subsequent steps of producing the end products hereof. It has been found that such tempering operation need consume only a period of three or four hours, whereupon the pellets are directed to fractionating apparatus 56 as shown in Fig. 1b.

Many types of machines available on the open market are suitable, but it has been found that good results can be obtained if the apparatus 56 takes the form of an impact mill. It is desired that the pellets 22 be broken, shattered or fragmented into a plurality of particles of irregular shape and to this end it is highly important that the machine 56 chosen for the purpose, be capable of performing the operation without added heat and without crushing action which would tend to form fine, dusty, powdery particles. Here again, it is to be pointed out that preservation of the vitamin A activity is highly important in this field and the use of many types of mills for the fractionating step would produce an extreme amount of heat and therefore, be detrimental to the product being handled thereby.

When an impact mill is used for the apparatus 56, the relatively hard, compact pellets 22, which incidentally are approximately half the size shown in Fig. 3, are in fact shattered into a plurality of smaller granules that are in the nature of fragments in that the same are of irregular configuration. The first break emanating from the mill 56 is thereupon directed to apparatus for grading the fragments so formed according to size. For purposes of illustration, such apparatus is shown in Fig. 1b in the form of a sifter 58 having a plurality of screens or sieves as a part thereof and operating on a vibratory principle as is well understood by those skilled in this art.

The sifter 58 is shown with but one pair of screens 60 and 62 provided to carry out one manner of forming the products hereinafter described, the screen 62 being appreciably finer than the screen 60. The sizes of screens 60 and 62 may be varied according to the desires of the processor and the nature of the products to be produced by the method hereof, but by way of example, extremely satisfactory results can be experienced in the provision of a 20-mesh screen 60 and a 94-mesh screen 62.

The screenings and the passes from sifter 58 may be utilized as marketable products if desired, but it is contemplated by the present invention that the screenings from screen 60 be further fragmented and for clearness, a second mill 64 for this purpose is shown in Fig. 1b. The pass from screen 60 gravitates to the screen 62 and the screenings from the latter constitute a primary product that is directed to a machine such as an aspirator 66 for removing all of the finer particles so as to assure a completely dust-free product that is designated by the numeral 68 and shown in Fig. 4 of the drawings. This product 68 may be loaded for shipment, directed to bulk storage or packaged as indicated by the numerals 70, 72 and 74 in the drawings.

The pass from screen 62 is likewise a vendible commodity and is designated by the numeral 76 in Fig. 5. The granules 76 may be shipped, directed to storage as at 28, packaged by a packer 80, or directed as at 82 to pellet mill 84 (Fig. 1a) for purposes hereinafter to be fully described.

The second break from mill 64 is graded in a similar manner and there is shown therefore, a sifter 86 identical with sifter 58 and having screens 88 and 90. Here again, the screenings from screen 90 constitute the product 68 and the pass from screen 90 comprises the product 76 which are directed from the sifter 86 to points of shipment, storage or pelleting in the manner above described.

The screenings from screen 88 are subjected to a third break by a mill 92 and such break is again directed to a sifter 94 having screens 96 and 98 like those previously described. It follows that the screenings from screen 98 and the pass from said screen 98 constitute the products 68 and 76 respectively.

By the time the material has been subjected to three breaks by means of mills 56, 64 and 92, the screenings from screen 96 are reduced in size to a point where the same may well be adapted for many uses, and one of such uses is in the dairy industry for use as cattle feed, there being shown for illustrative purposes, a packer 100 receiving such product. This product may however, be subjected to a fourth break through mill 102 if desired, whereupon grading takes place by means of sifter 104 having screens 106 and 108. Aspirator 66 receives the product 68 from sifter 104 constituting the screenings of screen 108, and the product 76 emanates from the sifter 104 as the pass of screen 108.

Manifestly, such procedure may be carried out until all of the parent product in the nature of pellets 22, is broken into products which are satisfactory for market purposes, or alternately, any screenings emanating from sifter 104 above screen 106, may be directed to a machine such as a hammer mill 110 capable of positively reducing the remaining granules to a fine consistency which are in turn received by a cyclone collector 112. The few remaining particles that are thus reduced in size by hammer mill 110 are re-directed into the sifter 104 for passage therefrom as products 68 and 76.

It is to be preferred that the aspirator 66 create a rather strong suction upon the product 68 passing therethrough to positively remove all dust or finely pulverized particles, and accordingly, some rather large granules will be carried therewith. Therefore, the material removed by the aspirator 66 is re-directed into the sifter 104 as shown.

The properties of the fractions or end products resulting from employment of the method as thus far set forth, are rather difficult to show and describe and for that reason Figs. 2 and 3 of the drawings are presented as a means of affording a full and complete understanding of the invention. By referring to Figs. 2 to 5 inclusive, the difference between the products 68—76 and ordinary alfalfa meal 14, as well as the differences and similarities between these new fractions and the parent pellet 22, can be appreciated.

The distinctive green color of regular dehydrated alfalfa meal 14 has always been one of its outstanding properties and is made up of several pigments. In the fractions 68 and 76 however, and for that matter in all of the products produced through the method hereof, the yellowish cast present in the meal 14 is virtually obliterated by the bright green color of the products 68 and 76 as compared with the rather pale, drab, green color of the meal 14. This very distinct deep green color adds a note of contrast that "dresses up" an otherwise unpalatable feed mixture when the products hereof are mixed with other ingredients by the mixed feed industry. By way of further explanation, the color of the novel products of this invention compare favorably with the good green color so highly prized by feed makers and found in the pellets 22 themselves.

The three products 14, 68 and 76 in Figs. 2, 4 and 5 respectively, are magnified approximately 35 times and, therefore, the relatively large, generally elongated particles of varying cross-sectional size in Fig. 2 and designated by the numeral 114, constitute the fiber of the alfalfa plant as the same appears in the dehydrated meal form emanating from hammer mill 12. Virtually all of the remaining parts of the meal 14 are made up of the leaf of the plant and is, for the most part, a fine pulverized, extremely dusty material designated by the numeral 116. It is to be noted in Fig. 2 of the drawings that each of the particles, whether in the form of material 114 or 116, is an individual unit separate from the remainder of the product and having no intimate interconnection or bonding whatsoever. The fiber 114 is readily discernible to the naked eye in the meal 14 and may be separated from the leaf powder with any probe. It has only a light greenish cast and therefore, shows up rather prominently in contrast with the greener leaf powder 116.

The product 68 is truly of a granular or fragmentary form as is apparent in Fig. 4, its granules being designated by the numeral 118. For the most part, each granule 118 is composed of an admixture of leaf and fiber and to a large extent, the fibers 120 have the leaf fragments 122 clinging thereto and clustered thereabout. Manifestly, the leaf in the product 68 is not of a fine pulverized form as in the case of the dusty particles 116, but by virtue of the fact that such dust particles 116 were intimately bonded together in the pellet 22, they remain so interconnected in the granules 118, except only that they take an irregular, fragmentary form and in many instances, remain joined to the fibrous particles 120. It is by virtue of these facts that the product 68 may be easily handled since the same will not bridge within a container, conduit, chute or other passageway through which it is caused to flow by means of conveyor or by the action of gravity. On the other hand, the meal 14 is virtually unmanageable in absence of being packaged in sacks or other containers. It will not flow by gravity without bridging and it is very difficult to move the same in bulk form through use of elevators, conveyors and the like.

Except only for the difference in size between the particles of fraction 68 and those of fraction 76, the latter has substantially the same properties as the granular product 68. In Fig. 5 it is seen that the granules 118 have been broken up into smaller granules 124 and these granules 124 for the most part, consist essentially of leaf material fused together in a homogeneous mass. The product 76 still retains the free-flowing characteristics and while the same is slightly more powdery than the product 68, it is not objectionably dusty and is fully acceptable in the industry as compared with the reluctance to purchase alfalfa meal such as 14.

The free-flowing characteristics of the novel fractions shown in Figs. 4 and 5 can be appreciated by the following chart showing the results of a test made with the three products 14, 68 and 76:

*Flow test through stainless steel 60° funnel having ⅛" orifice*

| Amt. | Product | Time in Seconds |
| --- | --- | --- |
| 10 gr. | Reg. Meal 14 | 154 |
| 10 gr. | Granular Fraction 68 | 23 |
| 10 gr. | Granular Fraction 76 | 88 |

It can also be seen from the following chart that all of the fractions herein produced consume considerably less space than the regular alfalfa meal 14. Thus, while it is still preferable in the interest of saving of space to store alfalfa products in pellet form, even the fraction 76 can be stored more economically than meal 14.

*Approximate average weights*

| Product | Pounds Per Bushel |
| --- | --- |
| Regular Meal 14 | 26.7 |
| Granular Fraction 76 | 33.2 |
| Granular Fraction 68 | 36.8 |
| Fraction Directed to Packer 100 | 39.7 |
| Pellets 22 | 53.5 |

Still another characteristic of the products is the protein and vitamin A content thereof. The fraction 68 is high in fiber content as compared with the product 76. Conversely, the fraction 76 is substantially all leaf and is therefore, an extremely highly concentrated protein and vitamin A product. Thus, while its flowability is not as good as that of the product 68, its highly enriched characteristics render it extremely valuable and of great demand on the market. It can therefore, be sold at a great profit to the manufacturer.

Furthermore, this product 76 may be used advantageously and profitably in the blending procedure above set forth by pelleting the same in mill 84. The pellets so formed may be shipped directly from the mill 84 as indicated by line 128, directed to bin 130 for preservation of the vitamin content thereof as in the case of bins 26 through employment of the method set forth in our co-pending application above mentioned, or directed to any suitable storage bin 132. In this connection, by virtue of the high vitamin A content of the product 76, a substantial amount thereof in pelleted form may be stored in preservation bins when such storage facilities are at a premium rather than utilize a large amount of space for pellets having a lower vitamin A content such as those above described and disposed in the bins 26.

It can now be seen that these highly concentrated pellets may be directed from the bins 130 or the bins 132 to receivers 38e and 38f respectively, for mixing with pellets of a lower grade in the reservoir 34. By this same token, low grade meal having little value on the market, and not of sufficient importance to warrant any attempt to preserve the vitamin A content within the bin 16, may be pelleted by mill 134 and utilized with the product 76 in pelleted form to produce a high grade blend emanating from the reservoir 34.

To further illustrate the procedure herein contemplated, 100 parts of blended pellets from reservoir 34 having 17.8% protein and 115,000 units of vitamin A, may be fragmented into products 68 and 76. The end result will be approximately 80 parts of fraction 68 having approximately a 17.3% protein content and containing 107,000 units of vitamin A. Approximately 20 parts of the product 76 will be produced and this product will have a 20% protein content, together with approximately 150,000 units of vitamin A. These approximate results can be attained regardless of what types of pellets are used in the blend, and to this extent it is a simple matter to utilize low value pellets by admixture with the pellets produced from product 76 in obtaining a blend for fractionating purposes having a sufficiently high protein and vitamin A content to produce the products 68 and 76 which will meet the standards initially set forth herein or exceed such standards as may be demanded by the industry.

It can now be appreciated that the use of the method hereof and the production of the products herein contemplated can be extremely profitable to the processor in that he can make virtually any type of product readily available on the market throughout the entire year. Frequently the prevailing market price for alfalfa meal or alfalfa pellets declines immediately prior to and during the haying season and rises to the highest peaks during the winter months. If, by following the process of this invention, large amounts of pellets or of the various fractions hereof are stored and preserved so far as vitamin A activity is concerned during the growing season, then the storage bins may be discharged for blending purposes at any time during the year and the products made available when the price is relatively high.

Leaf granules 76 may be produced from blended pellets, using various grades of the latter produced during normal growing seasons, having from 20 to 25% protein, as little as 14 to 18% fiber and from 150,000 to 300,000 I. M. per pound of carotene (pro-vitamin A). By choosing high grade pellets the percentage of protein can be increased far above 25%, the fiber can be kept far below 14% and the vitamin content can be increased even above the 300,000 I. M. figure. These values are exceedingly greater than can be produced in nature or through any other practical process known today.

It can now be appreciated that all the products hereof have advantageous characteristics and will increase the demand for alfalfa and related products in other fields such as in the widespread application of chlorophyll for diminishing human offensive odors, accelerating healing, reducing scar formation, stimulating normal cell growth, deodorizing malodorous lesions and other pharmaceutical uses.

The products themselves form the subject matter of our co-pending application, Ser. No. 346,911, filed on even date herewith and entitled "Granular, Dehydrated Products."

Having thus described the invention what is claimed as new and desired to be secured by Letters Patent is:

1. The method of producing substantially dustless feeds from alfalfa, grass and clover crops which comprises the steps of grinding the crops into a relatively fine dust composed of stem fibers and leaf segments; compressing the dust into relatively hard, compact pellets whereby to fuse together said fiber and leaf segments; subjecting the pellets to cracking sufficient only to shatter the same to granular fragments, in absence of complete pulverization, whereby to appreciably minimize the production of fine powder or minute particles; and removing from said fragments any fine powder or minute particles produced as a result of such cracking, whereby to present a free-flowing product wherein the leaf segments cling to the fibers in clusters in each of the fragments.

2. The method of producing substantially dustless feeds from alfalfa, grass and clover crops which comprises the steps of grinding the crops into a relatively fine dust composed of stem fibers and leaf segments; compressing the dust into relatively hard, compact pellets whereby to fuse together said fiber and leaf segments; subjecting the pellets to cracking sufficient only to shatter the same to granular fragments, in absence of complete pulverization, whereby to appreciably minimize the production of fine powder or minute particles; removing from said fragments any fine powder or minute particles produced as a result of such cracking, whereby to present a free-flowing product wherein the leaf segments cling to the fibers in clusters in each of the fragments, and whereby the percentage of leaf to fiber progressively increases as the size of the fragments decreases; and separating the fragments to present a plurality of grades having differing leaf to fiber ratios.

3. The method of producing substantially dustless feeds from alfalfa, grass and clover crops which comprises the steps of grinding the crops into a relatively fine dust composed of stem fibers and leaf segments; compressing the dust into relatively hard, compact pellets whereby to fuse together said fiber and leaf segments; subjecting the pellets to an impact sufficient only to crack the same into granular fragments, in absence of complete pulverization, whereby to appreciably minimize the production of fine powder or minute particles; and removing from said fragments any fine powder or minute particles produced as a result of such cracking, whereby to present a free-flowing product wherein the leaf segments cling to the fibers in clusters in each of the fragments.

4. The method of producing substantially dustless feeds from alfalfa, grass and clover crops which comprises the steps of grinding the crops into a relatively fine dust composed of stem fibers and leaf segments; compressing the dust into relatively hard, compact pellets whereby to fuse together said fiber and leaf segments; wetting the pellets, subjecting the pellets to cracking sufficient only to shatter the same to granular fragments, in absence of complete pulverization, whereby to appreciably minimize the production of fine powder or minute particles; and removing from said fragments any fine powder or minute particles produced as a result of such cracking, whereby to present a free-flowing product wherein the leaf segments cling to the fibers in clusters in each of the fragments.

References Cited in the file of this patent

UNITED STATES PATENTS 2,400,292  Dalton ---------------- May 14, 1946

FOREIGN PATENTS

| | | |
|---|---|---|
| 26,131 | Great Britain ------------ | Feb. 9, 1911 |
| 472,029 | Great Britain ---------- | Sept. 15, 1937 |
| 511,943 | Great Britain ----------- | Aug. 28, 1939 |
| 666,645 | Great Britain ------------ | Feb. 13, 1952 |